July 1, 1969

T. C. HUNTER, JR 3,453,519

POWER RESPONSIVE CURRENT REGULATOR

Filed April 11, 1967

INVENTOR.

*Thomas C. Hunter Jr.*

BY

*Roy L Parsell*

ATTORNEY

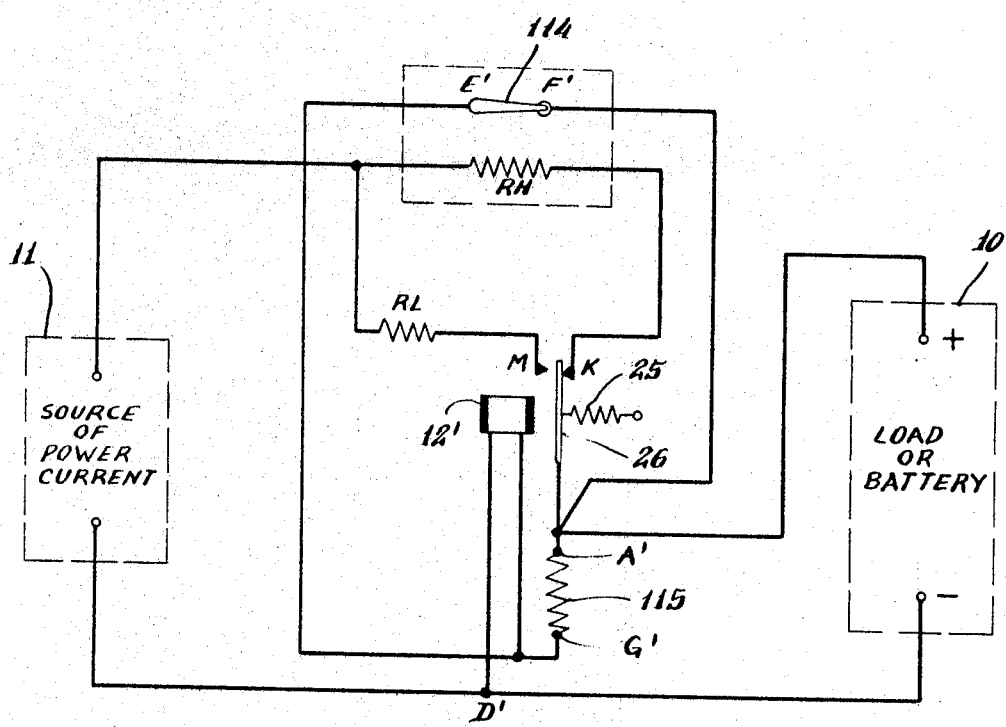

United States Patent Office 3,453,519
Patented July 1, 1969

3,453,519
POWER RESPONSIVE CURRENT REGULATOR
Thomas C. Hunter, Jr., New Haven, Conn.
(68 Church St., Winchester, Mass. 01890)
Filed Apr. 11, 1967, Ser. No. 629,952
Int. Cl. H02j 7/04, 7/16
U.S. Cl. 320—31                                                                 7 Claims

ABSTRACT OF THE DISCLOSURE

Apparatus and control circuit for regulating the flow of electric current from a source to a load circuit in which the control circuit is responsive to heat evolved from an element in a circuit conducting the current to the load. The heat responsive switch inserts a resistor in the voltage sensing circuit when the battery is discharged. This increases the current flow to the battery load because a greater voltage must be sensed before the regulator will decrease the input current. The device is adaptable to charging batteries especially where a surcharge is desirable.

---

This invention relates to new and improved apparatus and circuits for controlling the electric current flowing from a source point to a load circuit as might be used for example in charging batteries.

Certain types of batteries will normally recharge only to about 75% of the previous charge due to inherent characteristics of the battery per se as well as those characteristics of ordinary battery chargers. Other types of batteries often require a surcharge to maintain them in efficient condition. An example of the latter is found in the acid type of battery. In this type of battery the voltage across the terminals is a good indicator of the state of the charge however under certain conditions such as in electric trucks or submarines it is often necessary to provide a surcharge thus causing the liquid to decompose into bubbles of gas. These bubbles rise rapidly thereby mixing the electrolyte and preventing layers of different specific gravity from forming or stratifying.

The former type is exemplified in the alkaline battery. In this type the voltage across the terminals may be up to the predetermined standard but the state of the charge may be but only 75% of the full charge.

Therefore it is one of the objects of my invention to provide for additional or surcharges.

Another object is to provide an apparatus which can operate generally free of moving parts.

Still another object is to control the proper rate of charging.

Other objects and a fuller understanding of the invention may be had by referring to the following description and claims, taken in consideration with the accompanying drawings, in which:

FIGURE 3 is still another embodiment of my invention.

Figure 1:
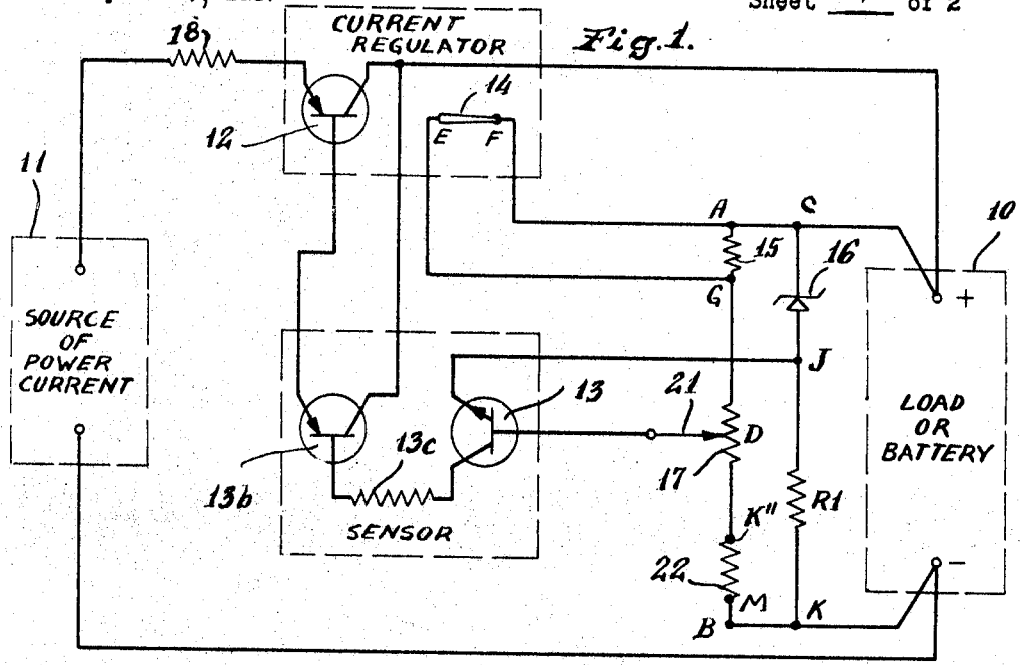
FIGURE 1 is a diagram of the basic circuits involved in practicing my invention.

Referring now to FIGURE 1 the numeral 10 designates the load which for example is a battery to receive a charge from a current source 11 through a valve or current regulator 12.

The ultimate current source 11 may be any suitable source which is obviously direct current or rectified alternating current of a voltage at least slightly higher than that voltage across the terminals of the load 10.

Since in battery charging procedure the voltage between the battery terminals is usually a good indicator of the state of charge, my preferred embodiment makes use of a voltage sensing circuit such as for example that disclosed in a publication of the Minneapolis-Honeywell Regulator Company of Apr. 15, 1961, No. 79–9031, based on an article by John F. Jacobs and James L. Lamm, entitled "Power Transistor Series Voltage Regulator."

Furthermore, since I make use of heat evolved from the current flow either at the current source or elsewhere in the charging circuit, I also prefer to use a power transistor as for example, the type referred to in the aforesaid publication as a convenient source of such heat.

Referring now to FIGURE 1 I provide a voltage reference circuit CK comprising a resistor $R_1$ and a diode 16 which circuit is connected across the terminals of the battery or other load. The diode 16 when used with current limiting resistor $R_1$ provides a fixed voltage CJ for reference. The inherent characteristic of a diode of the proper rating is to maintain a constant voltage.

Again referring to FIGURE 1 a pickoff circuit AB is also connected across the terminals of the battery or load. This pickoff circuit AB comprises a fixed resistor 15 between points A and G; a heat actuated switch 14 normally connecting points EF and which points are in turn connected to aforesaid points A and G so that switch 14 normally short circuits resistor 15; potentiometer 17; a movable pick off arm 21 adjustable along potentiometer making a contact at any desired point designated as D; and a fixed resistor 22.

Also in circuit with the voltage reference circuit CK and the pickoff circuit AB is a transistor 13 used to detect the difference in voltage between AD of the pickoff circuit AB and CJ of the reference voltage circuit CK.

Also in the sensor circuit is a transistor 13b used as a current amplifier; and a current limiting resistor 13c connected between transistors 13 and 13b. The output of transistor 13b being connected to power transistor 12 thus controls the current supplied to the battery or load whether it be zero current, full charging current, floating current or some other amount of current.

It should be noted at this point that should the heat actuated switch 14 operate to break the current connection between points E and F that resistor 15 will then be effective to cause a drop in voltage in th epickoff circuit AD.

Now when such a drop occurs the sensing circuit as hereafter described, will call for more current to pass through power transistor 12 and conversely a rise in pickoff circuit voltage will call for a reduction in current flow through transistor 12.

The operation of the sensing circuit is as follows. The voltage difference detector transistor 13 detects the difference in voltage between reference voltage CJ and the voltage AD at the pickoff arm contact point D of potentiometer 17.

Making use of the well known properties of the transistor whereby a small difference in voltage between points J and D, when applied to the transistor emitter and base terminals respectively controls the amount of current flowing through transistor 13, thereby controlling the current through current amplifier 13b, which in turn controls the current through transistor current regulator 12, which is the current supplied to the load from the source.

From the foregoing it will be seen that when this apparatus is connected to a load, the voltage at the load terminals will be proportional to the difference between reference voltage CJ and pickoff voltage AD. When the apparatus is to be used for battery charging, the pickoff voltage AD is adjusted to produce a voltage corresponding to the float voltage of a fully charged battery at the load terminals by locating the pick off arm 21 at the proper point D on potentiometer 17. When a discharged battery with its obvious low terminal voltage is connected as the load, the pickoff voltage AD will thus be reduced.

This low voltage at point D when compared with the reference voltage at point J by the voltage difference detecting transistor 13, will cause transistor 13 to increase the current flowing to transistor 13b, which will cause an increase in the current flowing to the battery through transistor 12 in the manner previously described, thus charging the battery.

Based upon the well-known fact that when the proper amount of current is passed through a transistor, heat will be produced, I have attached a normally closed heat actuated switch 14 to the current regulating or power transistor 12 to receive heat from this transistor. When a predetermined amount of heat, proportional to the charging current, has been received by the heat actuated switch, it will open thereby inserting resistor 15, connected between points AG, into the pickoff circuit AB. As previously explained, this causes a drop in voltage between points A and D, causing the sensor circuit to further increase the current supplied to the load in the manner previously described. The amount of the increase is determined by the value of resistor 15.

The flow of the load or charging current, thus increased, will charge the battery until the voltage across the terminals of the battery is great enough to balance the voltage between the pickoff circuit AD and the reference circuit CJ at which time the sensor circuit causes the transistor 12 to decrease or shut off this flow of current. The heat evolved from the transistor 12 will decrease with the decrease in current flow and in cooling the heat actuated switch 14 will close and short circuit the resistor 15 thus restoring the pickoff circuit to normal for the float voltage of the battery being charged.

Subsequently as the battery becomes discharged, its voltage will drop and the sensor circuit being connected across its terminals will call upon the power transistor 12 to pass a charging current to the battery load thus recharging the battery.

As a further illustration of my invention, take for example, the charging of an alkaline type of battery in which the voltage across the terminals may show it is up to standard rating during the charging operation but the battery is only charged to 75% of capacity in reality due to this particular inherent characteristic.

During the charging operation the heat evolved from the passage of the charging current has caused the heat actuated switch 14 to open and thus interpose resistor 15 into the pickoff circuit AD and the sensor circuit therefor calls for a flow of charging current. As this flow continues the voltage rises (above the standard rating for the particular battery) until it makes up for the increased voltage drop in the pickoff circuit AD due to the resistor 15 being interposed. The sensor circuit then causes the transistor 12 to decrease or shut off the flow of charging current. The heat actuated switch 14 then closes with the cooling down of transistor 12 and the pickoff circuit AB returns to normal.

In a like manner a surcharge may be placed on an acid type battery.

Figure 2:
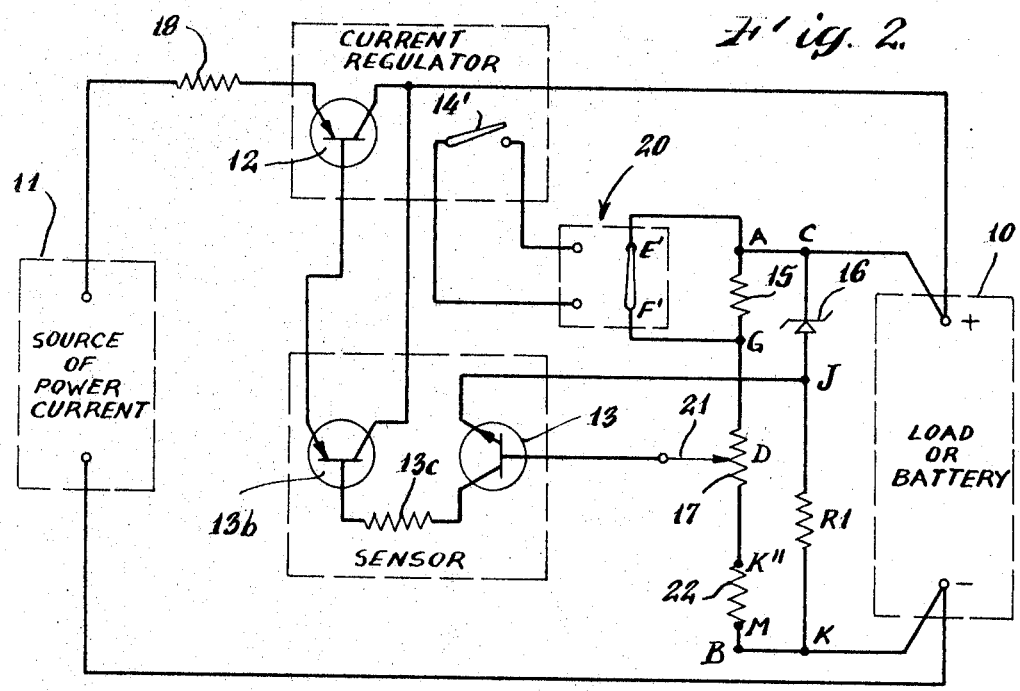
FIGURE 2 is a diagram showing another embodiment of my invention.

In another embodiment of my invention as shown in FIGURE 2, I have inserted a timer 20, started by the closing of a normally open thermal switch 14', which timer 20 adds resistor 15 to the pickoff circuit AB for a predetermined time for which the timer has been set, by opening the connection between points E' and F'. The short circuiting of resistor 15 is now dependent upon the period of the timer, not the action of the theraml switch 14 as in the previous example. As is obvious, the thermal switch 14 action is opposite to that of the heat actuated switch 14 of the first embodiment, which uses a normally closed thermal switch.

The timer 20 may be any well known type which is either electrically or mechanically driven and which may or may not automatically return to its starting point. I do not limit my invention to a heat actuated electrical switch as a mechanical trigger device may be used which will act upon the temperature thereof reaching a predetermined point to start the cycle of the timer running.

While in my preferred embodiment I attach the heat actuated switch 14 to the power transistor 12 it may be located in the vicinity of the transistor so long as it receives heat enough to actuate it. The heat actuated switch may also be located adjacent to a resistor such for example as resistor 18 which I may insert in the charging current circuit. If the current source 11 evolves heat which can be used to actuate my heat actuated switch I may locate it at that point or any point at which sufficient heat is evolved.

FIGURE 3 shows a further embodiment of my invention which relates to the use of a normally closed thermal switch 114 to insert a voltage dropping resistor 115 into a voltage sensing relay circuit.

Referring now to FIGURE 3, the numeral 10 represents the load, which for example might be a battery to be charged from a current source 11 through a high charge rate determining resistor RH, or a low or float charge rate determining resistor RL, as determined by the state of voltage sensing relay 12'. The state of the relay is determined by the terminal voltage of the load in this case for example a battery. If the battery terminal voltage is low, indicating a discharged battery, the voltage sensing relay 12' will not actuate because there is not enough current to energize the relay to overcome the biasing spring 25 which holds the armature 26 against the contact K for the high charge resistor RH circuit. When the battery is fully charged, its voltage is sufficient to actuate the voltage sensing relay 12' causing it to pull in its armature 26 against the resistance of the biasing spring 25, on to the contact M for the float charge resistor RL. This voltage sensing relay circuit comprises a fixed resistor 115 between points A' and G'; a thermal switch 114, normally connecting points E' and F' which points are in turn connected to points A' and G' on the resistor 115, so that switch 114 normally short circuits resistor 115.

Thermal switch 114 is so located that it receives heat from the high resistor RH. It should be noted at this point that should thermal switch 114 operate so as to break the connection between points E and F, that the resistor 115 will then be effective to reduce the flow of current in circuit A'G'D'.

Now when such restriction occurs, the battery terminal voltage must rise beyond the normal fully charged voltage in order to cause enough current to flow through the circuit to energize the relay 12', the amount being determined by the value of R115. When the relay so actuates, it pulls the armature 25 in, against the tension of biasing spring 25 to the contact M for the low charge rate circuit determining resistor RL.

This will thereby require the sensing relay RL1 to actuate at a higher voltage due to the imposed impedance of resistor 115. As the battery charge increases, its terminal voltage will rise in the manner previously described. This rise in voltage will then cause relay 12' to actuate thereby causing its armature 26 to pull in, removing RH, the high charge resistor, from the circuit and inserting RL, the low rate float charge resistor in the circuit. Since RH is no longer passing current, it will cool, allowing thermostatic switch 114 to close, short circuiting resistor 115 and restoring the current sensing relay circuit to normal.

In the event that a battery not requiring a full charge is connected to the apparatus circuit, insufficient heat would be generated by RH to open thermal switch 114, thus allowing relay 12' to continue to charge at the normal fully charged battery voltage or low rate instead of the high rate voltage as described earlier.

In still another embodiment which can be clearly understood by referring to FIGURE 1, I connect the heat actuated switch 14 to the terminals K and M of resistance 22 instead of the resistance 15 and I change the setting of switch 14 so that it closes when the temperature is above a predetermined point.

Upon the closing of switch 14 resistance 22 is no longer effective in the pickoff circuit AB. As a result a proportionate difference in voltage exists between AD and DB in which the voltage drop AD is again greater relative to DB so that the sensor calls for more current at the valve 12.

Furthermore in other embodiments I may locate my heat actuated switch to receive heat from the current flow at the local power source such as a generator or a transformer.

In a still further embodiment I may locate my heat activated switch to receive heat from an element in the sensing circuit such for example are transistors 13, 13b or resistor 13c.

Although I have described my invention with a certain degree of particularity, it is understood that the present disclosure has been made only by way of example and that numerous changes in the details of construction and the combination and arrangement of parts may be resorted to without departing from the spirit and scope of the invention as hereinafter claimed.

What is claimed is:

1. Circuit means for controlling the flow of current in a power circuit from a current source to the terminals of a load circuit in which the power circuit contains an element evolving heat upon the flow current through such element comprising in combination a valve means for regulating the flow of current in the power circuit means responsive to the output of a sensing circuit means, a sensing circuit means, said sensing circuit means having a reference voltage circuit means and a pickoff circuit means connected across the terminals of the load circuit, said output of said sensing circuit means responsive to the difference in voltage between said reference circuit means and said pickoff circuit means, a heat actuated switch means located to receive heat from such heat evolving element so that said switch means opens when its temperature is above a predetermined setting and closes when its temperature is below a predetermined setting, a resistor in said pickoff circuit means and connected with said switch means so that when said switch means is closed said resistor has no effect on said pick off circuit and when said switch means is open said resistor is imposed on said pickoff circuit to cause a drop in the voltage of said pickoff circuit means.

2. Circuit means for controlling the flow of a charging current in a power circuit from a current source to the terminals of a battery to be charged in which the power circuit contains an element evolving heat upon the flow of current through such element comprising in combination a power transistor in the power circuit for regulating the flow of current from the current source to the battery terminals responsive to the output of a sensing circuit means, a sensing circuit means, said sensing circuit means having a reference voltage circuit means and a pickoff circuit means connected across the terminals of the battery, said output of said sensing circuit means responsive to the difference in voltage between said reference circuit means and said pickoff circuit means, a heat actuated switch means located to receive heat from said power transistor so that said switch means opens when its temperature is above a predetermined setting and closes when its temperature is below a predetermined setting, a resistor in said pickoff circuit and connected with said switch means so that when said switch means is closed said resistor has no effect on said pickoff circuit means and when said switch means is open said resistor is imposed on said pickoff circuit means to cause a drop in the voltage of said pickoff circuit means.

3. In the circuit means of claim 2, means for varying the setting of the pick off voltage to correspond proportionally with the desired standard voltage of the battery.

4. Circuit means for controlling the flow of charging current in a power circuit from a current source to the terminals of a battery to be charged in which the power circuit contains an element evolving heat upon the flow of current through such element comprising in combination a current regulating valve means in the power circuit for regulating the flow of current from the current source to the battery terminals responsive to the output of a sensing circuit means, a sensing circuit means, said sensing circuit means having a reference voltage circuit means and a pickoff circuit means connected across the terminals of the battery, said output of said sensing circuit means responsive to the difference in voltage between said reference circuit means and said pickoff circuit means, a heat actuated switch means located to receive heat from said current regulating valve means so that said switch means is closed when its temperature is above a predetermined setting and is open when its temperature is below a predetermined setting, a timer having a switch means normally closed and which switch means opens upon starting of the timer and which remains open during the timing cycle and closes again on the ending of the timing cycle, a resistor in said sensing circuit and connected with said timer operated switch means so that when said timer operated switch means is closed said resistor has no effect on said sensing circuit means and when said timer operated switch means is open said resistor is imposed on said sensing circuit means to cause a drop in the voltage of a portion of said sensing circuit means, and said timer connected in circuit with said heat actuated switch so that upon closing of said heat actuated switch said timer is started which continues running until the end of the cycle for which it is set regardless of the position of said heat actuated switch after the starting of said timer cycle.

5. Circuit means for controlling the flow of a charging current in a power circuit from a current source to the terminals of a battery to be charged in which the power circuit contains an element evolving heat upon the flow of current there through comprising in combination a power circuit means having a low rate charging portion and a high rate charging portion, said high rate portion containing an element evolving heat upon the flow sufficient charging current there through, means for switching the charging current from one charging rate portion to the other charging rate portion comprising an electromagnetic switch means having an energizing coil responsive to a sensing circuit means, a sensing circuit means including said energizing coil and a fixed resistor, said resistor normally short circuited by a heat activated switch means when closed below a predetermined temperature and open above a predetermined temperature, said heat activated switch located to receive heat from said heat evolving element in said high charging rate circuit so that when said heat activated switch is closed said resistor has no effect on said sensing circuit means and when said heat activated switch is open said resistor is imposed upon said sensing circuit to reduce the flow of current in said electromagnetic coil, said sensing circuit means connected across the terminals of the battery and responsive to the voltage across said terminals whereby a voltage lower than a predetermined setting for said sensing circuit means will not pass sufficient current to energize said magnetic switch to direct the charging current through said low rate portion and when the voltage is above a predetermined setting will direct the charging current through said low rate portion.

6. In the circuit means of claim 1 said electromagnetic switch means having an armature to direct the charging current to the high and low rate portions respectively and a biasing means to maintain said armature to direct the charging current to said high rate portion and means for varying the biasing means to correspond to the desired voltage of the battery being charged.

7. Circuit means controlling the flow of power current including and from a current source to the terminals of a load circuit in which the circuit means includes an element evolving heat upon the flow of current through the element which is proportional to the power current flow comprising in combination a valve means responsive to the output of a sensing circuit means for regulating the flow of the power current in the power circuit, a sensing circuit means connected across the terminals of the load and responsive to the voltage of the load across the terminals thereof, said sensing circuit means having an impedance means responsive to a heat actuated switch means, means for adjusting said sensing circuit means to maintain a predetermined voltage level in the load circuit, a heat actuated switch means located to receive heat from such heat evolving element and connected with said impedance means such that when the temperature of said switch means is above a predetermined temperature setting the switch means will actuate said impedance means to delay the responsive output of said sensing circuit means when calling for restriction of the current flow in said valve means until the load circuit voltage has risen to a desired new predetermined level relative to said impedance.

References Cited

UNITED STATES PATENTS

| | | | |
|---|---|---|---|
| 2,311,574 | 2/1943 | Richards | 320—39 X |
| 2,427,729 | 9/1947 | Jenkins | 320—35 X |
| 2,967,988 | 1/1961 | Seright | 320—36 |
| 3,217,225 | 11/1965 | Gottlieb et al. | 320—40 X |
| 3,312,889 | 4/1967 | Gold | 320—36 |
| 3,354,374 | 11/1967 | Barry | 320—39 X |

JOHN F. COUCH, *Primary Examiner.*

S. WEINBERG, *Assistant Examiner.*

U.S. Cl. X.R.

320—35, 39; 322—33; 323—19